United States Patent [19]

Incledon et al.

[11] 4,384,320
[45] May 17, 1983

[54] PUSH-PULL SWITCHING MODE INVERTER-TYPE POWER SUPPLY

[75] Inventors: Stephen H. Incledon, Glendora; Bruce L. Wilkinson, Torrance, both of Calif.

[73] Assignee: Pioneer Magnetics, Inc., Santa Monica, Calif.

[21] Appl. No.: 342,466

[22] Filed: Jan. 25, 1982

[51] Int. Cl.³ .......................................... H02M 3/335
[52] U.S. Cl. ...................................... 363/25; 363/56; 363/97; 363/134
[58] Field of Search ........................ 363/24, 25, 55, 56, 363/97, 134

[56] References Cited

U.S. PATENT DOCUMENTS

| | | | |
|---|---|---|---|
| 3,041,472 | 6/1962 | Ingman | 307/261 |
| 3,699,358 | 10/1972 | Wilkinson | 323/272 X |
| 3,950,691 | 4/1976 | Ohba | 363/56 |
| 4,021,719 | 5/1977 | Patel | 363/56 |
| 4,067,057 | 1/1978 | Taddeo et al. | 363/97 X |
| 4,301,498 | 11/1981 | Farrer | 363/25 |
| 4,307,441 | 12/1981 | Bello | 363/25 |

*Primary Examiner*—William M. Shoop
*Attorney, Agent, or Firm*—Keith D. Beecher

[57] ABSTRACT

A system is provided for driving the switching transistors in a push-pull switching mode inverter-type power supply. The system of the invention provides drive current adjusted to the actual power supply load throughout the entire switching cycle from turn-on to the completion of turn-off for each of the switching transistors. There is essentially zero power dissipation in the various elements which make up the system. Moreover, the system obtains substantially all of its drive power from the outputs of the switching transistors themselves, and it provides transformer isolation for the switching transistors.

10 Claims, 4 Drawing Figures

PUSH-PULL SWITCHING MODE INVERTER-TYPE POWER SUPPLY

BACKGROUND OF THE INVENTION

Switching mode inverters are used to convert direct current power into high voltage alternating current power which may be subsequently rectified and used for energizing electronic equipment such as computers, data processors, and the like. Such inverters operate on the principle of cyclically storing electrical energy from an appropriate source in an electromagnetic device, such as a transformer, and releasing the power from the electromagnetic device into the load.

Switching mode inverters, in general, appear in the prior art as push-pull circuits incorporating power switching transistors which are turned on alternately to provide a high voltage alternating current output with a rectangular waveform. The rectangular waveform is usually modified by reducing the total duty cycle below 100% so as to prevent cross-conduction during the switching of the transistors, and also to produce some means for regulating the output voltage by adjusting the duty cycle.

In order to operate the switching transistors in such an inverter at power levels approaching the inherent limitations of the transistors themselves, special attention is required to insure correct drive current occurs under all operating conditions. Non-optimized drive current will shorten the life of the switching transistors and promote rapid transistor failure.

Low power dissipation in the drive system of the invention is desirable so that inexpensive components may be used, and so that the components may be mounted closely adjacent to one another to minimize the effects of inductance without the need to consider increased heating effects.

Also, the technique of obtaining the power for the drive system from the switching transistors themselves reduces the need for auxiliary power, and inherently causes the drive current to be proportional to load current for regulation purposes.

In addition, transformer isolation, as is achieved in the system of the present invention, permits referencing the drive controls to other than the emitter of the transistor being driven, thereby simplifying control and auxiliary needs.

DETAILED DESCRIPTION OF THE ILLUSTRATED EMBODIMENT

Figure 1:
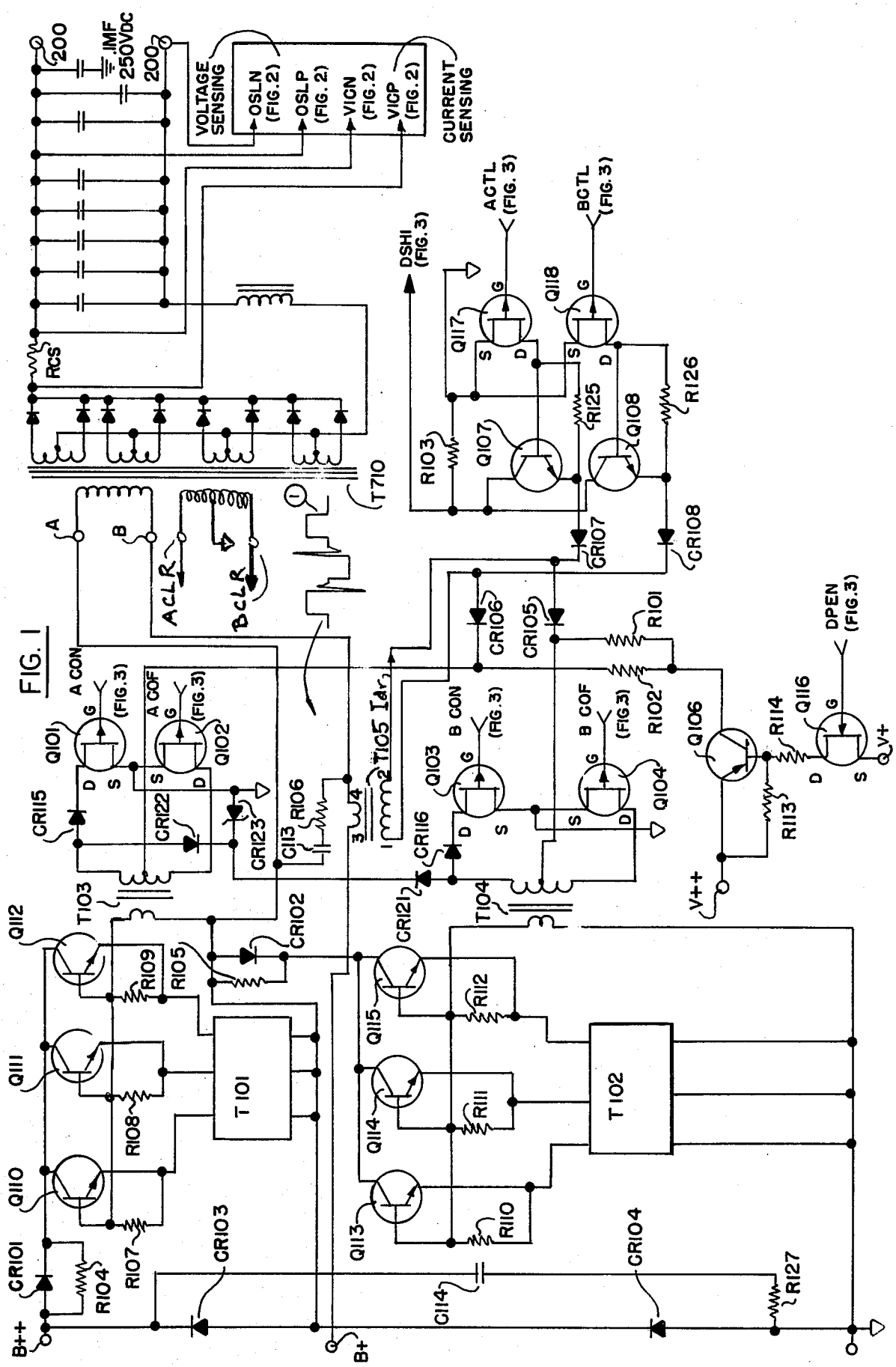
FIG. 1 is a circuit diagram of a push-pull switching mode regenerative inverter-type power supply using a drive system embodying the concepts of the invention; and of a typical transformer load which may be connected to the power supply.

The circuit of FIG. 1 includes a pair of input terminals connected across an appropriate source of direct current voltage, the terminals being designated respectively as B++ and chassis ground ( ). The voltage source may, for example, range between 250 and 400 volts DC, depending upon the requirements of the system. The circuit of FIG. 1 also includes a second terminal designated B+ which is connected to a source of direct current voltage which, for example, has one-half the value of the voltage of source B++.

Terminal B++ is connected through a diode CR101, which may be of the type designated 523007, to the collectors of three NPN transistors Q110, Q111 and Q112. These transistors may be of the type designated 548023. The diode CR101 is shunted by a resistor R104 which may have a value of 100 ohms. The bases of the transistors Q110, Q111 and Q112 are connected to one side of the secondary winding of a drive transformer T103, and to the respective emitters through respective 12 ohm resistors R107, R108 and R109.

A pair of diodes CR103 and CR104 are connected in series across the terminals B++ and ground, these diodes being of the type designated 522016 and 522010 respectively. A 0.33 microfarad capacitor C114 and a resistor R127 is connected across the diodes. The junction of the diodes is connected to a circuit represented by block T101 which contains current sharing transformers, such circuitry being described, for example, in Wilkinson U.S. Pat. No. 3,699,358 which issued Oct. 17, 1972. The three transistors Q110, Q111 and Q112 are used in parallel as one of the switching transistors of the system, and to replace a more expensive high power transistor. The circuit T101, as described in the Wilkinson patent, assures that all three transistors share the current equally, when in their conductive state.

The junction of the diodes CR103 and CR104 is connected to the other side of the secondary of the drive transformer T103, and to output terminal A. The terminal B+ is connected through the primary of a current transformer T105 to a second output terminal B. A resistor R106 and a capacitor C113 are connected across the output terminals A and B, resistor R106 having a resistance of 39 ohms and capacitor C113 having a capacitance of 0.0024 microfarads.

The junction of the diodes CR103 and CR104 is also connected through a diode CR102 to the collectors of a further group of NPN transistors Q113, Q114 and Q115. The diode may be of the type designated 523007, and it is shunted by a 100 ohm resistor R105. The transistors may be of the type designated 548023.

The base electrodes of the transistors Q113, Q114 and Q115 are connected to one side of the secondary a drive transformer T104, and through respective 12 ohm resistors R110, R111 and R112 to the respective emitters. The emitters are also connected to a circuit T102 which, in turn, is connected to ground, and, like the circuit T101 contains current sharing transformers, such as described in the Wilkinson patent referred to above.

The turns ratio of the drive transformers T103 and T104 may be 14:1. The primary of transformer T103 is connected through a diode CR115 to the drain electrode of a field effect transistor (FET) Q101, and directly to the drain electrode of an FET Q102. The FET's Q101, Q102 may be of the type designated 548024. The source electrodes of the FET's are grounded, and the gate electrodes receive control signals designated A CON and A COF from the control circuitry of FIGS. 3A, 3B.

Diode CR115 is also connected through a diode CR122 and through a diode CR121 to one side of the primary of transformer T104. The junction of diodes CR121 and CR122 is connected to a grounded Zener diode CR123. Diodes CR115, CR122 and CR121 may be of the type designated 525036, and the Zener diode CR123 may be of the type designated IN4761A.

The primary of drive transformer T104 is connected through a diode CR116 to the drain electrode of an FET Q103, and directly to the drain electrode of an FET Q104. These FET's may be of the type designated 548024. The diode CR116 may be of the type designated 525036. The source electrodes of FET's Q103 and Q104 are grounded, and the gate electrodes receive control signals from the circuitry of FIG. 3, designated B CON and B COF.

A turn-on and turn-off circuit is provided which includes a PNP transistor Q106 of the type designated 2N2907, the emitter of which is connected to the positive terminal of an auxiliary power source designated V++, and through a 1200 ohm resistor R113 to the base. The collector of transistor Q106 is connected to the center tap of the secondary of transformer T103 through a 360 ohm resistor R102, and to the center tap of the secondary of transformer T104 through a 360 ohm resistor R101.

The base of transistor Q106 is connected through a 680 ohm resistor R114 to the drain electrode of an FET Q116, the source electrode of which is connected to the positive terminal V+ of an auxiliary power source, and the gate of which receives a control signal DPEN from the control circuitry of FIG. 3. FET Q116 may be of the type designated J211.

A further switching circuit including NPN transistors Q107 and Q108 is connected to the secondary of current transformer T105 through diodes CR107 and CR108, which may be designated 525036. The diodes are also connected to the center taps of the drive transformers T103 and T104 through diodes designated CR106 and CR105, which may be designated 525036.

The emitters of the transistors Q107, Q108 are connected respectively to diodes CR107 and CR108, and through respective 10 kilo-ohm resistors R125 and R126 to the respective base electrodes, and to the drain electrodes of a pair of FET's designated Q117 and Q118. Transistors Q107 and Q108 may be of the type designated 2N222A, and the FET's may be of the type designated J271. The source electrodes of the FET's are grounded, and the collectors of the transistors Q107, Q108 are connected to a grounded 1 ohm resistor R103.

Figure 3A:
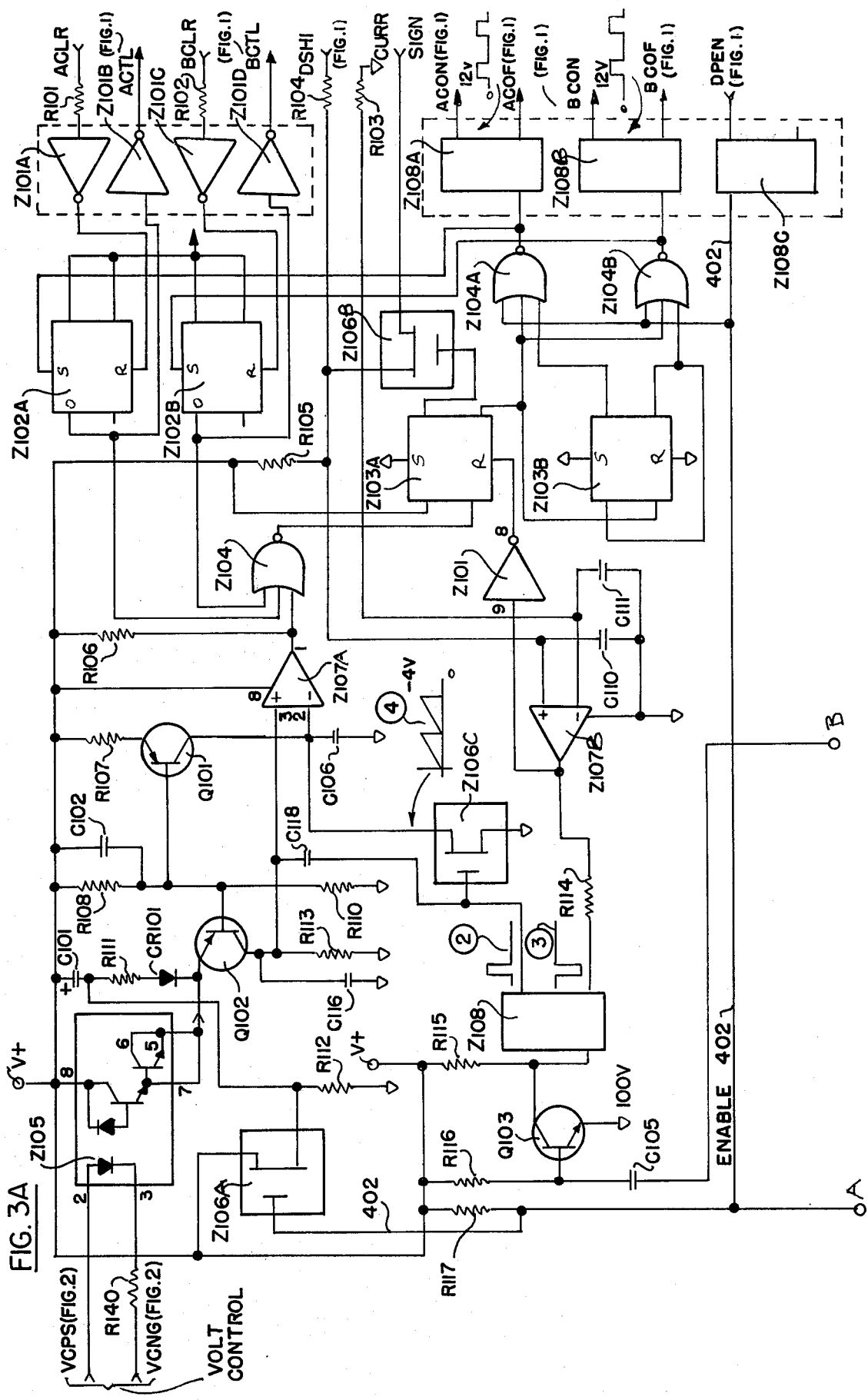
FIGS. 3A and 3B jointly form a circuit diagram of a control circuit which responds to the regulation control signals from the circuit of FIG. 2 to control the timing of the switching of the transistors of FIG. 1 for voltage regulation purposes.
Figure 3B:
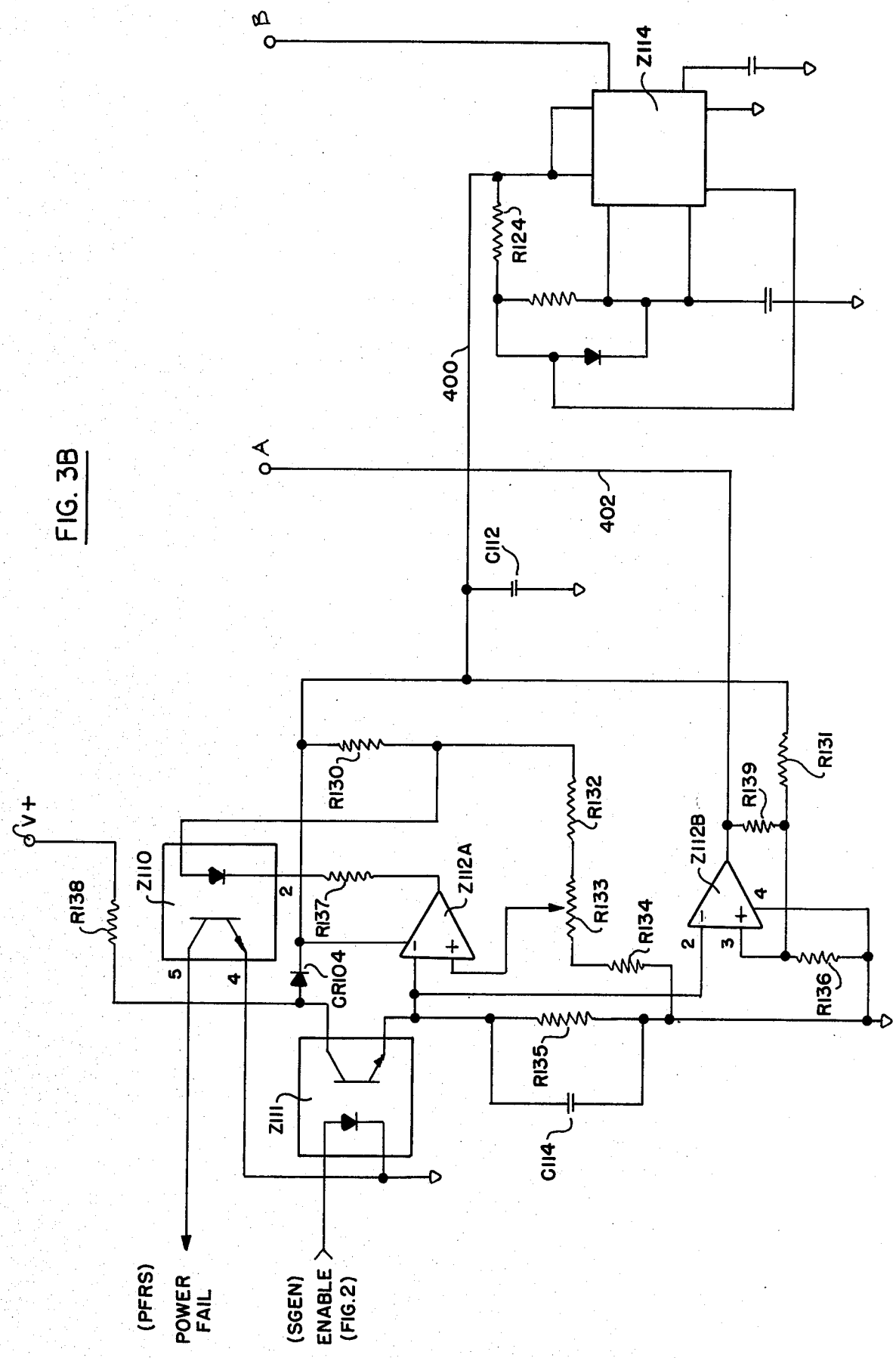

The gate electrodes of the FET's Q117 and Q118 receive respective control signals ACTL and BCTL from the control circuit of FIGS. 3A, 3B, and the collectors of transistors Q107 and Q108 supply a control signal DSHI to the circuit of FIGS. 3A, 3B.

In the circuit of FIG. 1, an initial current $I_{dr}$ is supplied to the primaries of the drive transformers T103 and T104, and switching currents are supplied to the switching transistors Q110, Q111, Q112 and Q113, Q114, Q115 by the driver transformers, and the drive transformers receive initial drive currents equal to $I_{dr} \times N_p/N_s$, where $N_p/N_s$ is the primary: secondary turns ratio of the driver transformers. The initial current $I_{dr}$ is supplied by the circuit of transistor Q106 when the enable signal (DPEN) is received from the circuit of FIG. 3. This initial current is necessary since it is clear that were the drive current for the switching transistors obtained only from the load current, no drive current would be available to start current flow in the system.

When current flow in the system has been established, current transformer T105, whose primary is connected in series with the load circuit, supplies additional drive current to the switching transistors through the drive transformers T103 and T104. The secondary of the current transformer T105 feeds the required additional drive current to the driver transformers T103, T104; with diodes CR106, CR105 serving to direct the additional drive current to the proper drive transformer as the current in the secondary of the current transformer reverses from one polarity to the other. This additional drive current is automatically adjusted to actual load conditions throughout the entire switching cycle because current transformer T105 is in series with the load. Specifically, the system provides drive current to the switching transistors which is proportional to load current both during time-on and time-off of each switching transistor.

If adequate values of drive current are supplied to the switching transistors, and if appropriate interleaved control signals A CON, A COF, B CON, B COF are applied to the FET's Q101, Q102, Q103, Q104, then the switching transistors will alternately supply a composite current to the primary of transformer T710, with the composite current supplied to the primary having a waveform ① shown in FIG. 1.

FET Q101 will turn on the switching transistors Q110, Q111, Q112 in response to the A CON signal; and FET Q102 will turn off the switching transistors Q110, Q111, Q112 in response to the signal A COF. Likewise, FET Q103 will turn on switching transistors Q113, Q114, Q115 in response to the signalk B CON; and FET Q104 will turn off the switching transistors in response to the signal B COF. This provides a positive switch-on and switch-off of the switching transistors to produce waveform ①.

While the system thus far described meets certain of the criteria set forth above, that is, (A) of providing a drive current for each of the switching transistors which is adjusted to actual load conditions throughout the entire switching cycle from turn-on to completion of turn-off; (B) of providing a drive system for the switching transistors which obtains most of the drive power from the output of the switching transistors themselves; and (C) providing a drive system which provides transformer isolation between the drive circuit and the switching transistors, the circuit thus far described does have a tendency to cause burn-out of certain of the circuit components, and to shorten the life of these components.

In particular, during saturated switching of the NPN switching transistors Q110, Q111, Q112 and Q113, Q114, Q115, the base of each switching transistor will normally hold above ground voltage, despite a reversal of base current, during part of the so-called storage time. This results in a reversed voltage which is reflected through the corresponding drive transformer T103, T104, and which normally would be clamped to ground by the diodes CR115 and CR116, and the FET's Q101 and Q103. In the process, large base current flows in each of the switching transistor during such a transition, and this large base current has a tendency to create hot spots in the transistors and to shorten the life thereof. The large base current in the switching transistors also creates large currents in the corresponding FET's Q101 and Q102 which are often beyond the capabilities of the FET's resulting in burn-out, or at least shortened life.

The circuit of transistors Q107, Q108 and associated FET's Q117 and Q118 in FIG. 1 is provided to avoid the situation described in the preceding paragraphs. This circuit serves to permit one side or the other of the secondary of the current transformer T105 to swing to a negative voltage during the transition time described above (see curve ① FIG. 1) causing the center tap of one of the driver transformers or the other to swing to a negative voltage.

The action described in the preceding paragraph is timed to occur at the time one or the other of the switching transistors is being switched off, and it permits the particular switching transistor to continue to operate in a conductive state during the so-called overlap interval so that excessive current flow in the drive circuit is prevented. During this operation, the potential of the base of the particular transistor is actually above ground while current is flowing out of it, and it returns power to the corresponding drive transformer T103, T104, and the voltage reversal is reflected through the current transformer T105, returning power to the load. The actual power involved is inconsequential, but the need to avoid dissipation in the various components of the drive circuit and to control the drive current during the particular interval is most desirable.

The circuit of FIG. 1 provides an A.C. power output across its output terminals A and B represented by waveform ①, and that output is applied to the primary winding of a transformer designated T710. The transformer T710 and its associated rectifying and filtering circuit responds to the A.C. power applied across its primary winding to produce a direct current output at its output terminals 200 which may, for example, in a particular application be 250 volts D.C.

A series resistor $R_{CS}$ is provided in the circuit of transformer T710, and a voltage appears across that resistor which is proportional to the load current drawn from the power supply. The resistor $R_{CS}$ is connected to the circuit of FIG. 2 through a pair of terminals at which current sensing signals designated VICN and VICP appear. Also, the voltage across the output terminals 200 is applied to the circuit of FIG. 2 by way of a pair of terminals at which voltage sensing signals designated OSLN and OSLP appear. These current sensing signals and voltage sensing signals are applied to the circuit of FIG. 2, for current limitation and voltage regulation purposes.

Transformer T710 also includes a further winding whose central tap is connected to chassis ground, and signals ACLR and BCLR appear at the respective sides of the latter winding in correspondence with the positive and negative half-cycles of waveform ①.

Figure 2:
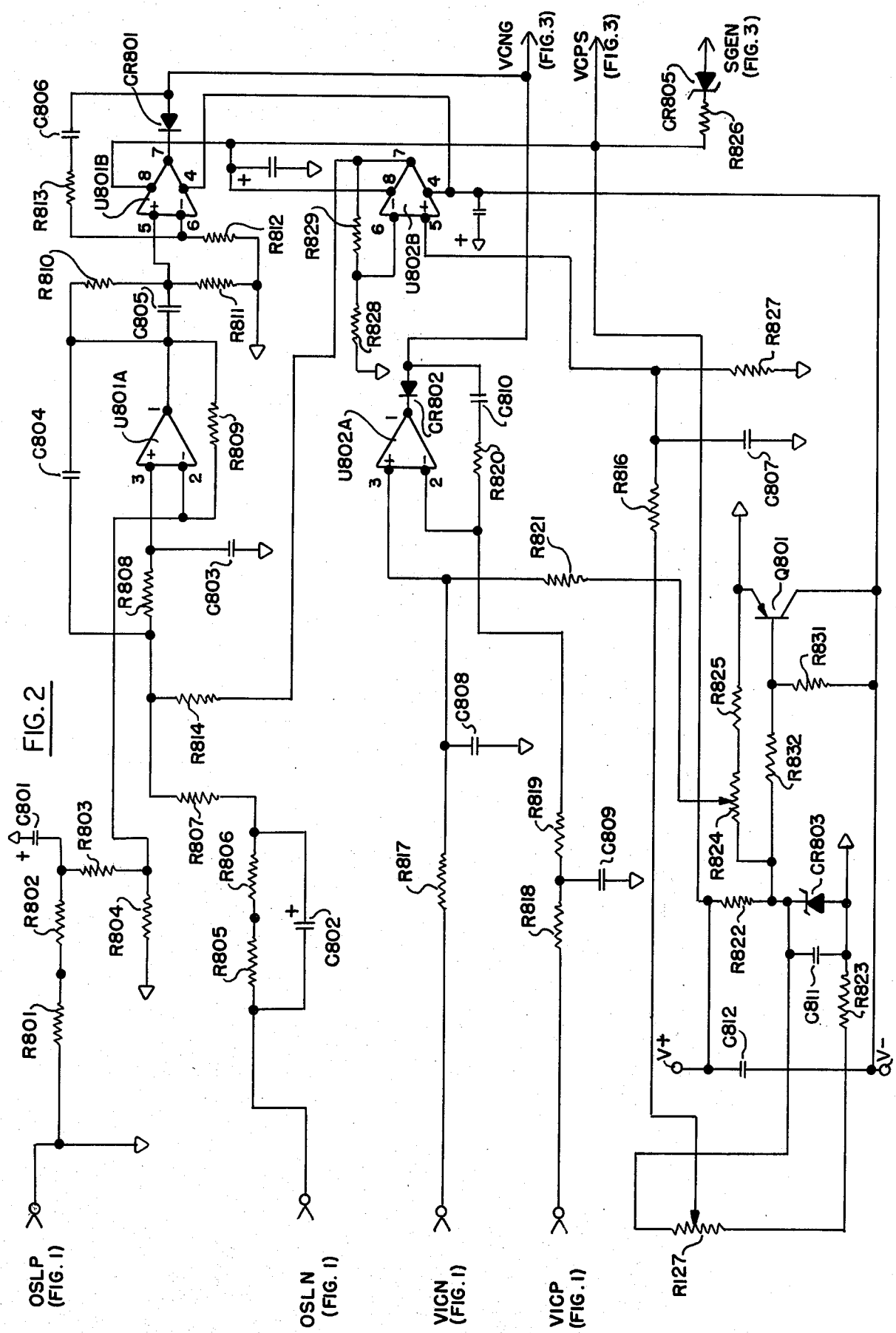
FIG. 2 is a circuit which receives certain voltage and current sensing signals from the circuit of FIG. 1, and which processes the signals in order to produce appropriate regulation control signals.

The voltage sensing signals OSLN and OSLP from the circuit of FIG. 1 are applied to correspondingly labelled input terminals in the circuit of FIG. 2. Terminal OSLP is grounded, and terminal OSLN is connected to the junction of a 100 ohm resistor R805 and a 680 kilo-ohm resistor R815. Resistor R805 is connected through resistors R806, R807 and R808 to the positive input of an amplifier U801. Resistors R805 and R806 are shunted by a capacitor C802. Resistor R806 may have a resistance of 200 ohms, resistor R807 may have a resistance of 10 kilo-ohms, and resistor R808 may have a resistance of 6200 ohms. Capacitor C802 has a capacity of 10 microfarads, and the amplifier U801 may be of the type designated TL082A.

The negative input of amplifier U801 is connected to a 200 ohm grounded resistor R804 and to a 10 kilo-ohm resistor R803. Resistor R803 is connected to ground through a 200 ohm resistor R802 and through a 100 ohm resistor R801, and resistor R803 is also connected to a grounded 10 microfarad capacitor C801.

The junction of resistors R807 and R808 is connected through a 2000 ohm resistor R814 to a 130 kilo-ohm resistor R830, the latter resistor being connected back to resistor R815. The positive input of amplifier U801 is connected to a grounded 0.01 microfarad capacitor C803, and the negative input is further connected to a 15 kilo-ohm resistor R809 which is connected to the output of the amplifier. The output of the amplifier is also coupled back through a 0.0039 microfared capacitor C804 to the junction of resistor R814 and resistor R808.

The output of amplifier U801A is coupled through a 0.022 is microfarad capacitor C805 to the positive input of a further amplifier U802B. Both amplifiers U801A, U801B may be included on a single integrated circuit chip of the type designated TL082A. The positive input of amplifier U8901B is also connected to a 27 kilo-ohm resistor R810 which is connected to the output of amplifier U801, and the positive input of amplifier 802 is also connected to a grounded 10 kilo-ohm resistor R811. The negative input of amplifier U802 is connected to a 3900 ohm grounded resistor R812, and the output of the amplifier is connected through a diode CR801 to an output terminal designated VCNG which supplies a correspondingly designated signal to the circuit of FIGS. 3A and 3B. Diode CR801 may be of the type designated IN4148. The anode of diode CR801 is coupled back to the negative input of amplifier U802 through a 0.01 microfarad capacitor C806, and through a 39 kilo-ohm resistor R813.

The voltage sensing signals OSLP, OSLN and the current sensing signals VICN, VICP from the circuit of FIG. 1 are applied to correspongly designated input terminals of the circuit of FIG. 2. The circit of FIG. 2 responds to the voltage sensing signals OSLP and OSLN, and to the current sensing signals VICN and VICP to produce an output signal VCNG to control the duty cycle of waveform ① (FIG. 1) and thereby regulate the output foltage at terminals 200 of FIG. 1.

Input terminal VICN is connected through a 2200 ohm resistor R817 to the positive input of an amplifier U802A. Amplifier U802A and a second amplifier U802B may be included in a single chip designated TL082A. The positive input of amplifier U802A is also connected to a capacitor C808 which may have a capacity of 0.022 microfarads. The input terminal designated VICP is connected to a 2200 ohm resistor R818 which, in turn, is connected to the negative input of amplifier U802A through a second 2200 ohm resistor R819. The junction of resistors R818 and R819 is connected to a grounded 0.022 microfarad capacitor C809.

The negative input of amplifier U802A is connected to a 100 kilo-ohm resistor R820 which, in turn, is connected to a 0.001 microfarad capacitor C810. The output of amplifier U802A is connected through a diode CR802 to the output terminal designated VCNG, and capacitor C810 is also connected to that output terminal. The negative input of amplifier U802B is connected to the junction of a 100 kilo-ohm resistor R829 and a 100 kilo-ohm resistor R828. Resistor R828 is grounded, and resistor R829 is connected to the output of amplifier U802B and to resistor R814.

The positive input of amplifier U802B is connected to a grounded 100 kilo-ohm resistor R827, and to a grounded 0.1 microfarad capacitor C807. The positive input is also connected through a 100 kilo-ohm resistor R816 to the moving contact of a 500 ohm potentiometer R127. The potentiometer R127 is connected to the cathode of a Zener diode designated CR803 and to a 0.1 microfarad capacitor C811, and the other side of potentiometer R127 is connected through a 750 ohm resistor R823 to ground. The Zener diode CR803, which may be of the type designated ZN423T has its anode grounded, and its cathode connected to the junction of an 820 ohm resistor R822 and 1300 ohm resistor R832. Resistor R822 is connected to the positive terminal of an auxiliary voltage source designated V+. The contacts designated 8 of amplifiers U801B and U802B are also connected to the positive terminal V+, and the contacts designated 4 of the amplifiers are connected to the negative terminal of the voltage source designated V—. A 10 microfarad capacitor C812 is connected across the positive and negative terminals. The output terminal designated SGEN is coupled through a Zener diode CR805 of the type designated 1N748A and through a 680 ohm resistor R826 to the positive terminal V+.

The junction of resistor R822 and the cathode of Zener diode CR803 is connected to a 500 ohm current limiting potentiometer R824 and to resistor R832. Potentiometer R824 is connected to a grounded 750 ohm resistor R825, and resistor R832 is connected to the base of a PNP transistor Q801 of the type designated 2N2907. The collector of the transistor is connected to the terminal V—, and the base is connected through a 22 ohm resistor R831 to the terminal V—. The movable contact of potentiometer R824 is connected through an 80.6 kilo-ohm resistor R821 to the positive terminal of amplifier U802A.

The amplifiers U801A and U801B are non-inverting amplifiers which function as a two-stage active filter to remove noise and ripple from the output signal VCNG. The amplifiers U801A and U801B also function as linear direct current voltage amplifiers. The positive reference voltage is introduced to the positive input of amplifier U801A through resistor R814, and the voltage OSLN is introduced to the positive input of amplifier U801A, and this voltage is subtracted from the reference voltage to cause the amplified output direct current voltage VCNG to decrease as the output voltage of the inverter increases so as to reduce the duty cycle of the inverter and thereby to regulate its output voltage. The reference voltage is set to a particular level by adjustment of potentiometer R127, as described above, and the particular voltage is applied to a buffer amplifier 802B whose output terminal is connected to the resistor R808.

The current sensing voltage VICN, VICP is applied across the inputs of amplifier U802A which is an inverting amplifier. A current reference voltage is established by potentiometer R824, and the VICN voltage is subtracted from the current reference voltage at the positive input of amplifier U802A. When the current load on the inverter of FIG. 1 exceeds a particular threshold, the VICN voltage pulls up the current reference voltage to a level at which the output of amplifier U801 goes negative to cut off diode CR801 and thereby reduce the duty cycle essentially to zero. Under these conditions the current limiting section of the circuit takes over to prevent current overloads. Under normal operation the voltage output of amplifier U801B holds the diode CR802 nonconductive, and the voltage section of the circuit regulates the output of the inverter by controlling the voltage level of VCNG through amplifier U801B and diode CR801. Resistor R813 and capacitor C806 serve as a stabilizing network for amplifier U801B; and resistor R820 and capacitor C810 serve as a stabilizing network for amplifier U802A.

The circuit of FIG. 2 supplies signals VCNG and SGEN to the circuitry of FIGS. 3A, 3B. The circuitry of FIGS. 3A, 3B includes a control circuit (FIG. 3B) which receives the enable signal (SGEN) from the circuit of FIG. 2 which designates that the source of power for the system is energized.

The SGEN signal is applied to an opto-isolator Z111 which may be of the type designated 528112. The output of opto-isolator Z111 appears across a 10 kilo-ohm resistor R135 which is grounded, and which is shunted by a 0.1 microfarad capacitor C114, and the output is applied to the negative input of a comparator Z112A, and to the negative input of a comparator Z112B. Both comparators may be included in a single chip designated LM393. The positive input of comparator Z112A is connected to the adjustable contact of a 10 kilo-ohm potentiometer R133 which is connected to ground through an 8660 ohm resistor R134, and which is connected to positive terminal V+ through a 10 kilo-ohm resistor R132, through a 270 ohm resistor R130, through a diode CR104, and through a 10 kilo-ohm resistor R138. The opto-isolator Z111 is also connected to resistor R138, as shown. Potentiometer R133 is set to establish the voltage level at which the output of comparator 2212A will go high.

A second opto-isolator Z110 (FIG. 3B) has its input connected to the output of comparator Z112A and to the junction of resistors R130 and R132. The opto-isolator Z110 may also be of the type designated 528112. The output of opto-isolator Z110 is applied to an output terminal which provides an output PFRS (Power Fail) which indicates when there is a power failure in the system.

The positive input of comparator A112B is connected to a grounded 22 kilo-ohm resistor R136, and the output supplies an enable signal to the circuitry of the control circuit of FIGS. 3A, 3B when the enable signal SGEN from FIG. 2 is high. The output terminal of comparator Z112B is connected back to the positive input through a 68 kilo-ohm resistor R139. The positive input is also connected through a 22 kilo-ohm resistor R131, and through diode CR104 and resistor R138 to the positive terminal V+.

The control circuit of FIGS. 3A, 3B also includes a pulse generator which includes a multivibrator Z114 (FIG. 3B) of the type designated NE555, and which constitutes a master synchronizing osillator. The pulse generator is energized by the positive voltage V+ from a lead 400 which is connected to a grounded 0.1 microfarad capacitor C112.

When the enable signal SGEN is high, the lead 42 connected to the output of comparator Z112B goes high to enable the control circuit. Lead 402 is connected to a toggle flip-flop Z108C (FIG. 3) which may be contained, together with toggle flipflops Z108A and Z108B (FIG. 3A) in a chip designated CD4041UBE. The output of toggle flip-flop Z108C provides the enable signal DPEN for the circuit of FIG. 1 enabling the source V++ to provide power for the circuit. The enable lead 402 is also connected to a pair of "nor " gates Z104A and Z104B contained in a chip designated CD4025, to toggle the flip-flops Z108A and Z108B to opposite states. The enable lead 402 is also connected to a CMOS switch Z106A (FIG. 3A) which may be contained in a chip CD4066B, to provide a voltage across a 27 kilo-ohm resistor R112 to enable the upper portion of the circuit of FIG. 3A. It will be noted that the enble lead 402 is connected to the positive terminal V+ through a 12 kilo-ohm resistor R117.

The voltage control signals from the circuit of FIG. 2, VCNG, VCPS are applied to the input terminals designated VCPS and VCNG of the circuit of FIG. 3A, the terminals being connected through a 3300 ohm resistor R140 to an opto-isolator Z105 of the type designated 528120. The output of opto-isolator Z105 is connected to ground through a 10 kilo-ohm resistor R111, and through resistor R112, resistor R111 being connected to the output through a diode CR101. Resistor R111 is connected to a 10 microfarad capacitor C101 which, in turn, is connected to the positive terminal V+. The diode CR101 is connected to the emitter of a PNP transistor Q102, whose collector is connected to a 27 kilo-ohm grounded resistor R113, which is shunted by a 470 picofarad capacitor C116.

The base of transistor Q102 is connected to an 18 kilo-ohm grounded resistor R110, and is connected to the positive terminal V+ to a 12 kilo-ohm resistor R108, which is shunted by a 0.1 microfarad capacitor C102. The base of transistor Q102 is also connected to the base of a PNP transistor Q101, both transistors being of the type designated 2N2907. The emitter of transistor Q101 is connected to the positive terminal V+ through a 18 kilo-ohm resistor R107. The collector of transistor Q102 is connected to a comparator Z107A which may be of the type designated LM393. The voltage appearing at the positive input of comparator Z107A is a direct current voltage which varies, for example, from 0 to 4 volts, depending upon the amplitude of the voltage applied across the input of the opto-isolator Z105 which is proportional to the output voltage of the circuit of FIG. 1.

The pulse generating multivibrator Z114 produces a series of pulses which are introduced to the base of an NPN transistor Q103 (FIG. 3A) through a 68 picofarad capacitor C105, the base being connected to the positive terminal V+ through a 33 kilo-ohm resistor R116. These pulses appear across a 5600 ohm resistor R115 which connects the collector to the positive terminal V+, the emitter being grounded. Transistor Q103 may be of the type designated 2N2360. These pulses are applied to a buffer Z108 which may be of the type designated CD4041UBE, which provides two opposite polarity pulses ① and ② in response to each input pulse. Pulse ① is used to turn on CMOS switch 2106C, to discharge the voltage across grounded 100 picofarad capacitor C106, to cause a sawtooth voltage to be applied to the negative input of comparator Z107. The output of comparator Z107A is connected to the positive terminal V+ through a 12 kilo-ohm resistor R106, and flip-flop Z103A is connected to the positive terminal V+, as shown.

The positive input of a comparator Z107B is connected to the positive terminal V+ through a 15 kilo-ohm resistor R105, and receives the DSHI signal from the circuit of FIG. 1 through a 13 ohm resistor R104. The negative input of comparator Z107B is grounded. The positive input of the amplifier is connected to a grounded 100 picofarad capacitor C110, and the negative input is connected to a grounded 100 picofarad capacitor C111. The comparator Z107B may be of the type designated LM393. The "nor" gate Z104 may be of the type designated CD4025B. The other output terminal of the buffer Z108 is connected through a 12 ohm resistor R114 to the output of amplifier Z107, and to an inverter Z101. The inverter Z101 provides a reset pulse for the flip-flop Z103A.

One output of the device Z103 is connected to a CMOS switch Z106 which may be of the type designated CD4066B, and which serves to connect the positive input of amplifier Z107 to a lead designated CURR SIGN. The negative input of amplifier Z107 is connected to ground through a 1300 ohm resistor R103. The flip-flop Z103A is connected to a second flip-flop Z103B, as shown, and these flip-flops may be contained in an integrated circuit chip designated CD4013. The outputs of flip-flop Z103B are connected to the "nor" gates Z104A and Z104B, as shown.

The reference voltage V+ from the circuit of FIG. 2 is applied to the circuit of FIG. 3A as a voltage designated VCPS, together with the output voltage VCNG from the circuit of FIG. 2. These voltages are applied across opto-isolator Z105 to control the current flow through the opto-isolator and through transistor Q102. This causes a voltage to appear across resistor R113 which is proportional to the voltage VCNG and which is applied to the positive input of comparator Z107.

The pulse generating circuit of multivibrator Z114 (FIG. 3B) introduces pulses to transistor Q103 (FIG. 3A). The pulses from transistor Q103 are applied to buffer amplifier Z108 which produces positive and negative output pulses ② and ③ at its respective output terminals. As mentioned above, the positive pulses ② are applied to CMOS switch Z106C cyclically to discharge capacitor C106. Capacitor C106 is charged from the reference voltage V+ through transistor Q101. The result is a sawtooth wave ④ which is introduced to the negative input of comparator Z107A. The output of the comparator Z2107A goes low each time the sawtooth wave crosses the voltage level established by VCNG. This output is passed through "nor" gate Z104 and it clocks data flipflop Z103A. The data terminal of flip-flop Z103A is wired high, so that the flip-flop is triggered to its set state each time the output of "nor" gate Z104 goes high. The flip-flop Z103A remains on until it is reset by the next timing pulse from buffer amplifier Z108, which is received through inverter Z101. Therefore, for each cycle, flip-flop Z103A remains on for a time proportional to the voltage VCNG.

Flip-flop Z103B toggles at the trailing edge of the negative output from flip-flop Z103A. Thus, for successive cycles, the pulses representing the on state of flip-flop Z103A are applied alternately through "nor" gates Z104A and Z104B to corresponding buffers Z108A, Z108B which produces signals A CON, A COF and B CON, B COF which control the FET's Q101, Q102 and Q103, Q104 of FIG. 1 to turn the switching transistors Q110, Q111, Q112 and Q113, Q114, Q115 on and off, and which establish controlled duty cycles for regulating the output voltage of the inverter and for limiting its load current.

The circuit including comparators Z112A, Z112B in FIG. 3B supplies an ENABLE voltage on lead 402, to enable "nor" gates Z104A, Z104B; and to supply the signal DPEN to the circuit of FIG. 1 for enabling purposes, only when the power supply voltage is sufficient to operate the inverter. The circuit includes an opto-isolator Z111 which establishes voltage at the negative inputs of comparators Z112A and Z112B only if the circuit board containing the circuit of FIG. 2 is plugged in, and only if the power supply voltage V+ is above a particular threshold.

The output of comparator Z112B will then go low causing the ENABLE lead 402 to go low and thereby to enable the system to be activated. The output of comparator Z112A will go high if the power supply fails, energizing opto-isolator Z110 to produce a power fail signal PFRS which is used to energize an appropriate alarm or indicator.

The "nor" gates Z104A and Z104B are also connected to the set terminals of flip-flops Z102A and Z102B, as shown, these flip-flops being contained in a chip designated CD4013A. The latter flip-flops are connected to a series of inverters designated Z101A, Z101B, Z101C and Z101D, all of which may be contained in a chip designated CD40105BE. The signal ACLR which is derived from the auxiliary winding of transformer T710 (FIG. 1) is applied to the input of inverter Z101A through a 39 kilo-ohm resistor R101. The signal ACTL appears at the output of inverter Z101B and is introduced to the circuitry of FIG. 1. The signal BCLR which is also derived from the auxiliary winding is introduced to the input of inverter Z101C through a 39 kilo-ohm resistor R102. The output of inverter Z101D supplies the signal BCTL to the circuit of FIG. 1.

The circuit containing flip-flops Z102A, Z102B is an overlap control circuit which is described and claimed in copending application Ser. No. 341892, filed Jan. 22, 1982, which is assigned to the present assignee. This circuit serves to prevent cross-conduction in the switching transistors Q110, Q111, Q112 and Q113, Q114, Q115 in FIG. 1. The overlap control circuit as described in detail in the copending patent application, permits operation of the inverter power supply with up to 100% duty cycle without permitting damaging cross-conduction of the switching transistors.

It has characteristically been necessary in switching mode power supplies to provide a time interval, usually fixed, between the conductive intervals of the switching transistors so as to prevent conduction from one of the switching transistors directly through the other during the storage time of the transistor being turned off. These so-called through currents cause high stress and frequent failure of the switching transistors because there is no inherent limit to the magnitude of the through currents, and because the through currents do not pass through the load circuit.

The overlap control circuit described and claimed in the copending application prevents the non-conductive switching transistor from being turned on until the end of the storage interval in the conductive switching transistor, so that the conductive switching transistor has ceased to conduct and the so-called through currents are eliminated.

As described above, the signals ACLR and BCLR are derived from the auxiliary winding of transformer T710 of FIG. 1. Signal ACLR is high when the switching transistors Q110, Q111, Q112 are conductive, and does not go low until the end of the storage interval, after these switching transistors have been shut off. The signal BCLR, on the other hand, goes high when the switching transistors Q113, Q114, Q115 are conductive, and does not go low until the end of the storage interval after the latter switching transistors are finally shut off.

When ACLR is high, flip-flop Z102A is set, and its output O is high, this flip-flop having been set by the output of "nor" gate Z104A which generates the ACON switching signal causing the switching transistors Q110, Q111 and Q112 to be conductive. The flip-flop Z102A remains high until after the ACOF signal causes the switching transistors Q110, Q111, Q112 to be turned off, and after the predetermined storage time, at the end of which the transistors Q110, Q111, Q112 become non-conductive. At the end of the storage time, the signal ACLR goes low, signifying that the switching transistors Q113, Q114, Q115 may now be turned on. When ACLR goes low, flip-flop Z102A is reset, and its output O goes low. At this time, even if the output of comparator Z107A had previously gone low, indicating that the time had come to switch on transistors Q113, Q114, Q115, the transistors will not actually be switched on, until ACLR goes low, indicating the end of the storage time, insofar as transistors Q110, Q111, Q112 are concerned. Only after ACLR goes low, will flip-flop Z102A be reset, permitting the output of "nor" gate Z104 to go high to trigger flip-flop Z103A to its set state causing the switching signal B CON to be generated to switch on the transistors Q113, Q114, Q115.

The same operation occurs when transistors Q113, Q114, Q115 are switched off. Again, transistors Q110, Q111, Q112 cannot yet be switched on until the end of the storage time, at which BCLR goes low. When that occurs, flip-flop Z102B is reset, so that, again, the output of "nor" gate Z104 goes high, to clock the flip-flop Z103A.

The invention provides, therefore, a drive system within a push-pull regenerative switching mode inverter-type power supply which is automatically adjusted to the actual power supply load throughout the entire switching cycle from turn-on to the completion of turn-off for each of the switching transistors, and which obtains substantially all of its drive power from the outputs of the switching transistors themselves. The particular embodiment of the invention illustrated and described provides transformer isolation for the switching transistors, and there is essentially zero power dissipation in the various elements which make up the drive system.

It will be appreciated that while a particular embodiment of the invention has been shown and described, modifications may be made, and it is intended in the following claims to cover all modifications which come within the true spirit and scope of the invention.

What is claimed is:

1. In a push-pull switching mode inverter-type power supply which includes an electromagnetic storage device and first and second switching transistors connected to the storage device for cyclically storing electrical energy in the storage device and releasing the energy into a load, said switching transistors introducing electrical energy into the electromagnetic storage device having positive halfcycles and negative half-cycles and further having a transition time between each of said half-cycles, a drive system for said switching transistors for alternately turning said switching transistors on and off, said drive system including: first and second switching circuits coupled to the first switching transistors respectively serving to turn the first switching transistors on and off; third and fourth switching circuits coupled to the second switching transistors respectively serving to turn the second switching transistors on and off; control circuitry connected to said first and second switching circuits and to said third and fourth switching circuits for supplying two distinct control signals to said first and second switching circuits and two distinct control signals to said third and fourth switching circuits to cause each of said first and second switching transistors cyclically to turn on and turn off, and with the first and second switching transistors being rendered conductive in alternate cycles.

2. The system defined in claim 1, and which includes a first drive transformer coupling the first and second switching circuits to the first switching transistors, and a second drive transformer coupling the third and fourth switching circuits to the second switching transistor.

3. The system defined in claim 1, and which includes a current transformer having a primary winding connected in series with the drive transistors and the storage device so that current flow introduced into the storage device by said switching transistors flows through the primary winding of said current transformer; and circuit means connecting the secondary winding of the current transformer to said first and second switching transistors to provide drive power for said switching transistors.

4. The system defined in claim 2, and which includes a current transformer having a primary winding connected in series with the drive transistors and the storage device so that current flow introduced into the storage device by said switching transistors flows through the primary winding of said current transformer; and circuit means connecting the secondary winding of said current transformer to said first and second switching transistors to provide drive power for said switching transistors, said circuit means including a first connection from one side of the secondary winding of said current transformer to an intermediate tap on the primary winding of the first drive transformer, and a second connection from the other side of the secondary winding of said current transformer to an intermediate tap on the primary winding of the second drive transformer, and first and second diodes respectively included in the first and second connections.

5. The system defined in claim 3, and which includes a further circuit connected to said switching transistors for supplying initial power to the switching transistors when the power supply is first turned on.

6. The system defined in claim 4, and which includes a further circuit connected to the intermediate taps on said primary windings of said drive transformers for supplying initial power to the switching transistors when the power supply is first turned on.

7. The system defined in claim 3, and which includes further circuitry connected to each side of the secondary winding of the current transformer to permit the voltage at one side or the other of said secondary winding to swing freely beyond a reference potential level, and control circuitry connected to said further circuitry for introducing control pulses to said further circuitry to cause the sides of said secondary winding of said current transformer to swing freely only during the transition time between successive half-cycles of said electrical energy introduced into said electromagnetic storage device.

8. The system defined in claim 4, in which said first and second switching circuits are connected to the respective sides of the primary winding of the first drive transformer and alternately connect said sides to a point of reference potential, and said third and fourth switching circuits are connected to the respective sides of the primary winding of the second drive transformer and alternately connect said last-named sides to said point of reference potential.

9. The system defined in claim 8, in which said switching circuits each includes a field effect transistor switching device.

10. The system defined in claim 8, and which includes further circuitry connected to each side of the secondary winding of the current transformer to permit the voltage at one side or the other of the secondary winding to swing freely beyond said point of reference potential, and control circuitry connected to said further circuitry for introducing control pulses to said further circuitry to cause the sides of the secondary winding of said current transformer to swing freely only during the transition time between successive half-cycles of said electrical energy introduced into said electromagnetic storage device.

* * * * *